United States Patent [19]

Shuman

[11] 4,403,437
[45] Sep. 13, 1983

[54] TORSIONALLY LOADED TREBLE HOOK WITH PIVOTABLE WEED GUARD

[76] Inventor: Ervin H. Shuman, 720 NE. 18th Ave., Ocala, Fla. 32670

[21] Appl. No.: 241,726

[22] Filed: Mar. 9, 1981

[51] Int. Cl.³ .............................................. A01K 83/02
[52] U.S. Cl. ......................................... 43/36; 43/43.6
[58] Field of Search ................... 43/43.4, 43.6, 34, 36

[56] References Cited

U.S. PATENT DOCUMENTS

| | | | |
|---|---|---|---|
| 3,205,607 | 9/1965 | Rossnan | 43/36 |
| 3,222,814 | 12/1965 | Rossnan | 43/36 |
| 3,359,625 | 12/1967 | Rossnan | D22/30 X |
| 3,751,844 | 8/1973 | Rossnan | 43/36 |
| 3,986,290 | 10/1976 | Chapman | 43/43.6 |

Primary Examiner—Nicholas P. Godici
Assistant Examiner—M. Jordan
Attorney, Agent, or Firm—Duckworth, Allen, Dyer & Pettis

[57] ABSTRACT

A torsionally loaded treble hook is disclosed characterized by the fact that the torsion is provided by a torsion member in the form of a wire which is disposed adjacent to and substantially parallel to the shanks of the hooks. The shank of the hooks and the major portion of the torsional member are enclosed in a sleeve in a closely packed configuration so that the width of the shank portion of the treble hook is minimized. The trigger mechanism disclosed is a pivotable and collapsible weed guard. A method of making the novel treble hook is also disclosed.

6 Claims, 17 Drawing Figures

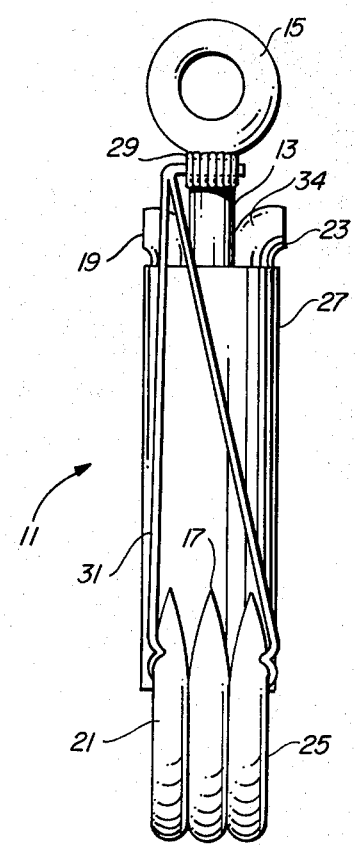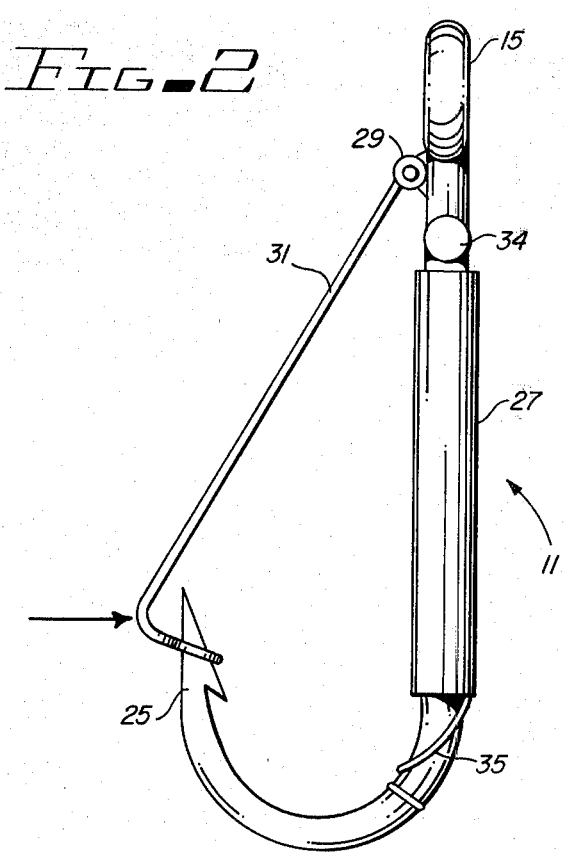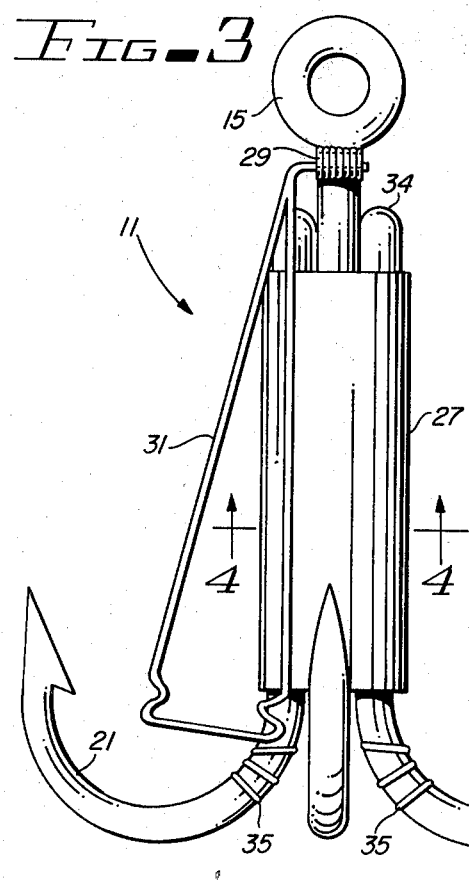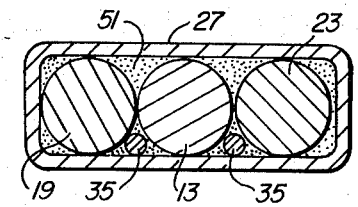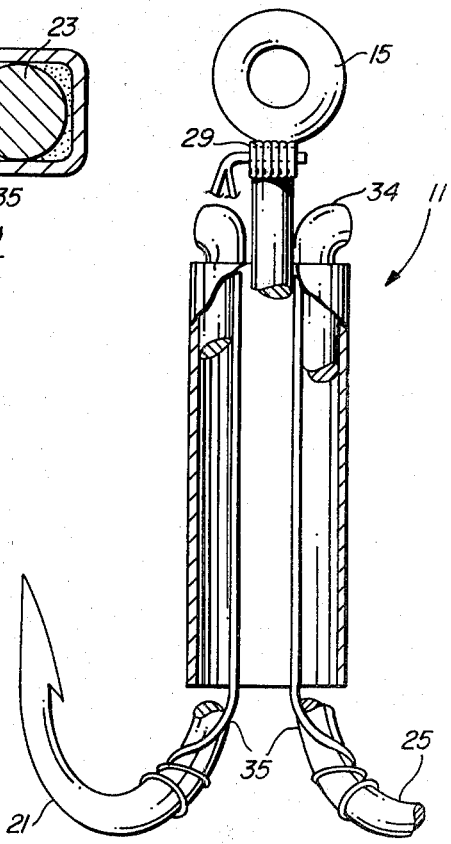

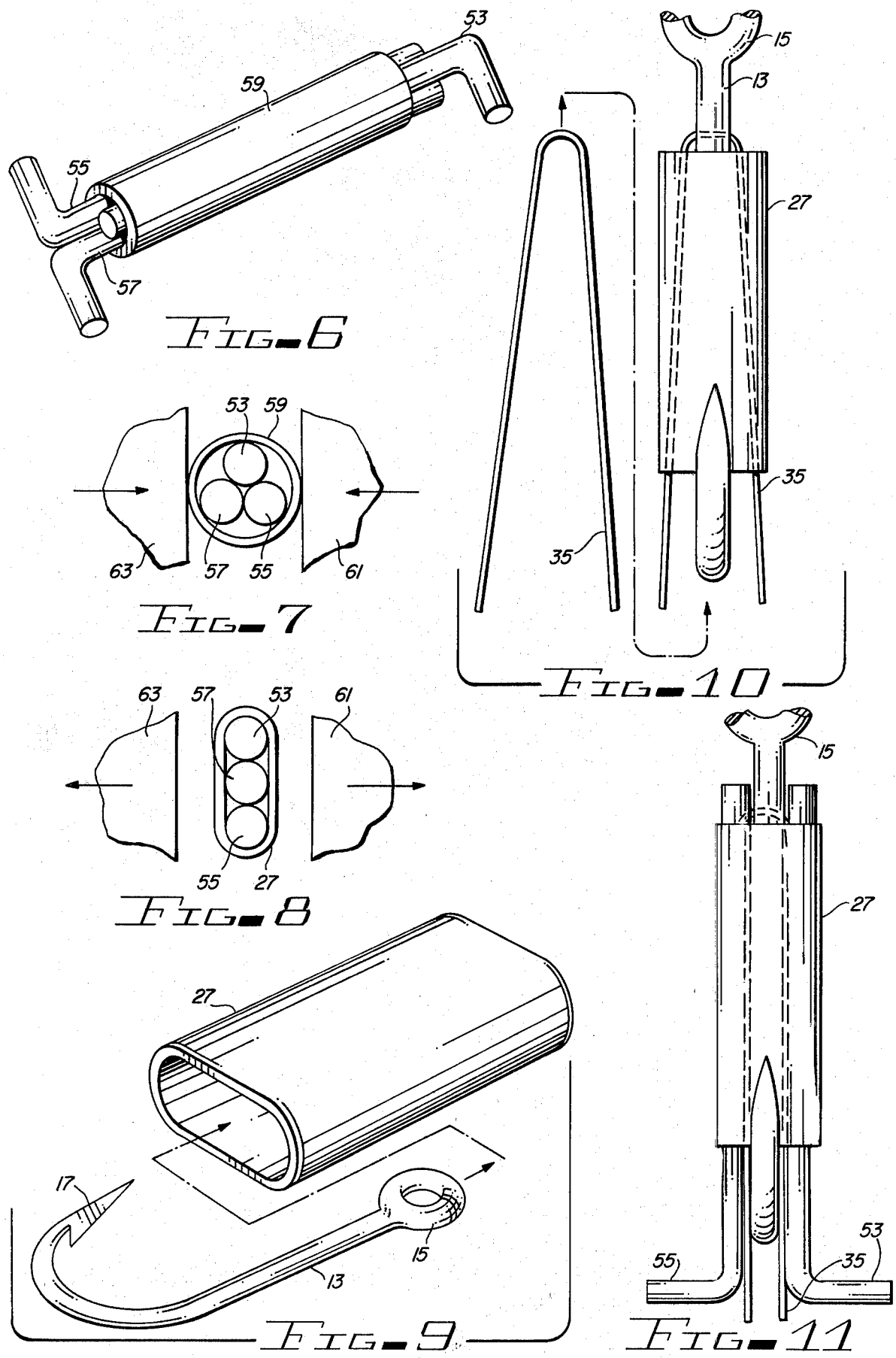

U.S. Patent  Sep. 13, 1983  Sheet 3 of 3  4,403,437
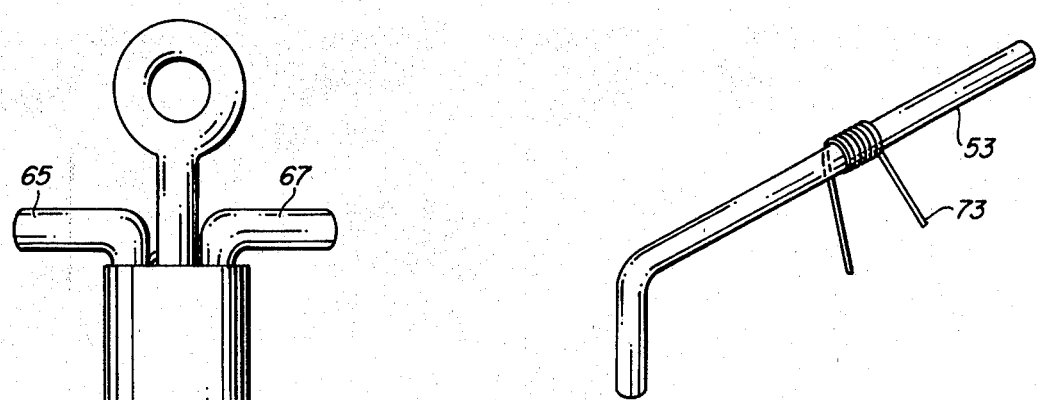
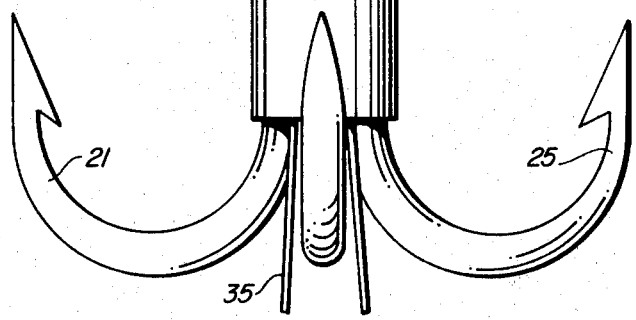
FIG-12
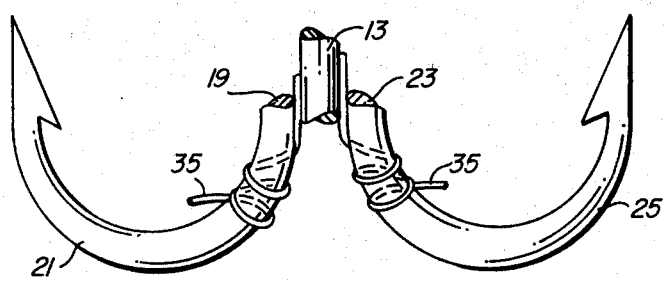
FIG-13
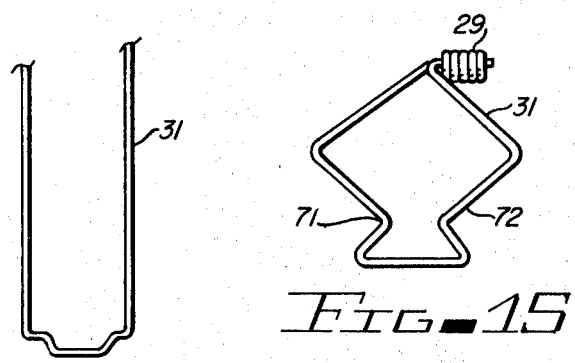
FIG-14     FIG-15
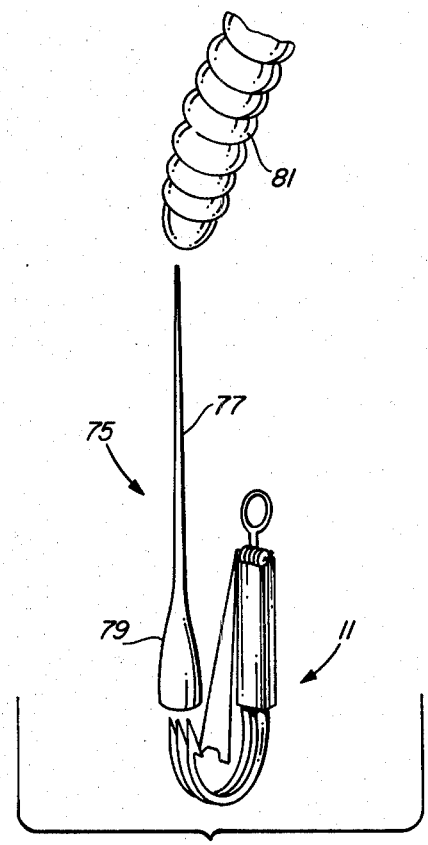
FIG-16
FIG-17

TORSIONALLY LOADED TREBLE HOOK WITH PIVOTABLE WEED GUARD

BACKGROUND OF THE INVENTION

This invention is directed to fishing hooks in general and more in particular to an oscillatable treble hook with a minimized cross sectional area at the shank portion, having a trigger mechanism in the form of a collapsible weed guard.

Fishing devices with a plurality of oscillatable hooks are known as disclosed in Rossnan, U.S. Pat. Nos. 3,205,607, 3,222,814, and 3,751,844. One of the disadvantages of these hooks is that they use a coil spring to provide the energy for the oscillating motion. The use of a coil spring on the shank or shanks of hooks makes the fishing device very cumbersome. One type of fishing lure is the "plastic worm" and the use of coil springs on the shanks of hooks make it very impractical to insert into a plastic worm with this type of device. The reason being that the bent ends of the oscillatable hooks protrude significantly and thereby tear the lure when it is inserted. Another problem is the possibility of dirt, grit, or other trash getting in between coil spring and shank thereby impeding the operation of the hook. Yet another problem is that because of the overall width needed for clearance of coil springs in relation to the shanks of the hooks, it is more likely to pick up grass and other vegatation when pulled through such areas when fishing, again making the device impractical. Still another disadvantage of the devices as disclosed in the aforementioned patents is that they utilize a tensioned weed guard for the purposes of keeping weeds from getting caught on the barbs of the hook and as shown in U.S. Pat. No. 3,751,844, to hold the barbs together until the time the fish strikes. The weed guard is formed so that it exerts substantial tension on the barbs when it is in the closed position, and it is not free to collapse or be displaced toward the shank portion of the treble hook. The disadvantage of this type of weed guard is that if a person is pulling the device through heavy weeds, there is a very good chance of it releasing the hooks too soon and becoming caught on the weeds. In that case one must retrieve the device or cut the line and loose the device. Another problem with that type of weed guard is that there are times when it will not release all of the hooks as intended, it may release only one or sometimes both, but in most cases, it will still apply pressure to the main hook next to the barb, so as to render the main hook useless. Because that type of weed guard is rigidly fastened to the shank of the main hook it can easily be damaged or bent out of shape on being struck by a fish, so as to make it ineffective for further use.

BRIEF SUMMARY OF THE INVENTION

The improved tensionally loaded treble hook of the present invention is characterised by the fact that a main hook is mounted in a sleeve or collars secured to the main hook. A tension torsion member, comprising a thin wire secured to the oscillatable hooks to bias it away from the main hook which is fixed to the sleeve or collars. A weed guard that serves to keep the grass from collecting on the hooks has a formed end with a detent so as to hold the barbed portion of the hooks together, and is released therefrom by the bite of a fish. The weed guard is flared at the top and constricted at the center so as to provide a triggering action when the fish bite. The weed guard is designed to pivot at its anchor position near the eyelet of the main hook, so as to prevent damage or any further interference with the hook after the device has been triggered by a fish that strikes. The weed guard also has the advantage of being able to be pivoted away from the shank of the main hook, so as to make it a simple matter to insert it into a plastic worm. The invention also comprises a method of making the treble hook disclosed. Also disclosed is a hook inserter which is designed to temporarily hold the barbed ends of the oscillatable hooks together, and includes a needle-like point being of such length as to be able to be pushed through a plastic worm at a starting point for the plurality of oscillatable hooks. The end of the hook inserter is a tapered funnel shaped portion of sufficient width to engage the three hooks of the device.

BRIEF DESCRIPTION OF THE DRAWINGS

Further details are explained below with the help of the examples illustrated in the attached drawings in which FIG. 1 is a front view of the torsionally loaded treble hook of the present invention;

FIG. 2 is a side view of the treble hook in the closed position;

FIG. 3 is a front view of the treble hook in the open position;

FIG. 4 is a cross sectional view through 4—4;

FIG. 5 is a partial cutaway view of the treble hook in the open position;

FIG. 6 is a side view of a tube which is to be made into a sleeve, and the forming tools used;

FIG. 7 is a cross sectional view of the tube at the beginning of the forming process;

FIG. 8 is a cross sectional view of the formed sleeve;

FIG. 9 is a side view of the main hook being inserted into the sleeve;

FIG. 10 is a front view of the main hook, sleeve and torsion member configurations;

FIG. 11 is a front view of the main hook, sleeve, torsion member and forming tools;

FIG. 12 is a front view of the center of the main hook, and two oscillatable hooks, the sleeve and the torsion member;

FIG. 13 is a detail of the front view of a method of attachment of the torsional member to the oscillatable hooks;

FIG. 14 is a top view of the weed guard;

FIG. 15 is a front view of the weed guard;

FIG. 16 is a side view of the forming tool and the coiled hinge or pivot; and

FIG. 17 is a side view of the hook inserter.

DETAILED DESCRIPTION OF THE PREFERRED EMBODIMENT

Illustrated in FIGS. 1 and 2 is the torsionally loaded treble hook 11 of the present invention in the closed position. The treble hook includes a central hook 13 having eyelet 15 and barbed end 17. A left oscillatable hook 19 having barbed end 21 and a right oscillatable hook 23 having barbed end 25 are disposed adjacent to central hook 13. A sleeve 27 surrounds the shank portion of the hooks 13, 19 and 23. While a single sleeve 27 is illustrated in FIGS. 1 and 2, it is possible to use two collars disposed on opposite ends of the shank portions of hooks 13, 19, and 23. A coiled hinge or pivot 29 is attached to the top portion of the shank of central hook 13 and adjacent the eyelet 15. A weed guard 31 is coupled to the coiled hinged or pivot 29 so that it can freely pivot on pivot 29. A torsion member 35 is also illustrated in FIG. 3 attached to right hook 23 and left hook 19. The details of the functions and construction of the torsion member 35 are disclosed below in the following description of a method of making the torsionally loaded treble hook 11. In the closed position illustrated in FIGS. 1 and 2, the weed guard 31 serves both as a weed guard and as a restraint on the torsionally loaded hooks 13, 19 and 23.

Illustrated in FIG. 3 is the torsionally loaded treble hook 11 in the open position. The importance of this figure is that it illustrates the advantage of the freely pivoting weed guard 31, which moves out of the way when the treble hook 11 is opened.

Torsion member 35 is disposed so as to provide torsion tending to open the hooks even while the treble hook 11 is in the open position. This means that left hook 19 and right hook 23 are torsionally loaded even while the treble hook 11 is in the open position. The bent portion 34 of the shank portions of left hook 19 and right hook 23 provides a stop that resists the preloading torsion.

One advantage of the torsionally loaded treble hook 11 of the present invention is illustrated by reference to FIG. 4. FIG. 4 is a cross section through 4—4 in FIG. 3. Sleeve 27 surrounds the shank portions of hooks 13, 19 and 23. Torsion member 35 is adjacent the hooks 13, 19 and 23 in a closely packed arrangement. Solder 51 is placed at either end of sleeve 27, and acts somewhat as a bearing in allowing hooks 19 and 23 to rotate. The advantage of using torsion member 35 is that the cross sectional area of the torsionally loaded treble hook 11 is minimized, thus permitting smaller or larger hooks to be utilized when desired.

FIG. 5 is a partial cutaway view of the torsionally loaded treble hook 11 and illustrates the torsional member 35 which is a thin wire, preferably made of stainless steel, although other non-corrosive material may be used. The torsion member 35 is shaped like an inverted V and is secured to hooks 19 and 23 by winding and soldering at the bottom part of the rounded portion of hooks 19 and 23.

FIGS. 6-13 illustrate a method of making the novel torsion loaded treble hook 11. The sleeve 27 is formed by inserting three forming tools 53, 55 and 57 into the interior of a cylindrical metal tube 59. The forming tool 53, 55 and 57 are L-shaped steel rods which should be of substantially the same cross sectional area as the shank portion of hooks 13, 19, 23, or slightly larger. The metal tube 59 with the forming tools 53, 55 and 57 is then placed between two platens 61 and 63 (FIG. 7), such as provided by a vise and the tube is then compressed (FIG. 8). After the compression step the tube 59 has been deformed into the shape of the sleeve 27, having a somewhat elliptical cross section.

The next step in making the device is to insert central hook 13 into the sleeve 27 (FIG. 9). The torsion member 35 is then placed inside the sleeve 27 and the top portion of the torsion member 35 is disposed adjacent to the lower portion of the shank of hook 13 (FIG. 10). Forming tools 53 and 55 are then inserted into the sleeve 27 so that central hook 13 is in between the forming tools 53 and 55 (FIG. 11). The torsion member 35 is placed in the cusps formed in between the forming tools 53 and 55 and the central hook 13. (See also FIG. 4.) Care should be taken that forming tools 53 and 55 extend through sleeve 27 and up to eyelet 15 of the main hook. The top portion of sleeve 27 should be a distance of four to eight times the diameter of the shank of central hook 13 from the eyelet 15 of the central hook 13. If two sleeves are used, the top portion of the sleeve should also maintain the aforementioned spacing, and the bottom portion of the bottom sleeve should be against the curve of the central hook 13. The flat area of sleeve(s) 27 should be in a position so when the two side hooks 19 and 23 are added (in a later step) all three hooks will be in proper relation.

The next step in this method is to solder the ends of the sleeve 27. Solder should be applied liberally so that the solder flows freely around the central hook 13 and torsion member 35. The reason for this is the solder joins the sleeve 27 to the main hook and also forms a journal for the torsion member 35, and a bearing surface for hooks 19 and 23. The forming tools 53 and 55 and torsion member 35 are preferably made from a material that does not adhere to solder; such as stainless steel. This allows the forming tools 53 and 55 to be removed leaving cavities for inserting hooks 19 and 23, and additionally allows the torsion member 35 to freely rotate.

The next step is to insert hooks 19 and 23 into the cavities vacated by the forming tools 53 and 55. The hooks 19 and 23 have a straight shank portion with no eyelets (the eyelets have been cut). The shank portion of hooks 19 and 23 are then extended through sleeve 27 so that their ends protrude past the top of the sleeve 27. The ends of the shank portion of hooks 19 and 23 are then bent outwardly to form extensions 65 and 67. Extensions 65 and 67 are subsequently trimmed so that they do not protrude past the cross sectional area defined by the sleeve (see FIG. 1). This step helps maintain the overall compactness of the torsionally loaded treble hook 11.

The torsion member 35 is wrapped around and attached close to the base of the curved portion of the hooks 19 and 23, as shown in FIG. 13. This is accomplished by taking one end of torsion member 35 and bending it sharply (approximately 90°) in a direction opposite to the position it will be in when the hooks are in an open position. Next, the end of the torsion member 35 is rotated in a direction opposite from the direction that the hook 19 will be turning from a closed position. This step provides the preloaded torque on the torsion member 35. With hook 19 in the open position the end of torsion member 35 is then brought over the tip of hook 19 and wrapped tightly around hook 19 near the base of the curve of the hook 19. The torsion member is preferably wrapped three times about the hook 19.

The same procedure is then repeated with hook 23 and the other end of torsion member 35. Flux is then placed on the part of the torsion member 35 that was wrapped around the base of hooks 19 and 23. Solder is then applied to that wrapped portion. This step locks the torsion member 35 permanently in place. Any excess wire from the torsion member 35 is then trimmed.

The weed guard or trigger 31 is formed into the shape illustrated in the top view of FIG. 14 and in the end view of FIG. 15. The weed guard 31 is made preferably out of stainless steel wire. The wire is first formed in a U shape with a flat bottom with sharp corners. The ends of the wire are then criss crossed to form a small triangle at the bottom of the wire. The ends of the wire are then pulled apart. The bottom portion is then bent upwards and the ends of the wire are brought close together. This provides a weed guard 31 having an end view as shown in FIG. 15. The weed guard 31 has a constricted portion or throat 71 which helps maintain the hooks in the closed position, and also provides a slight resistance so that the treble hook 11 is not opened accidentally. The weed guard also includes a flared portion 72 immediately above the constricted position 71.

Another advantage of the constricted portion 71 of the weed guard 31 is that the triggering action is more sensitive to certain "bites", particularly those that occur at the area of contact between the weed guard 31 and the barbed ends 17, 21, and 25. This action is best illustrated by reference to FIG. 2 in which an arrow indicates the force exerted by the particular type of bite. With an existing weed guard, the effect of such a bite would result in the weed guard being slightly deflected but the hooks remaining closed (i.e. untriggered). With the novel collapsible weed guard 31 of the present invention the weed guard would be triggered even with such a force. The reason for this action is that as the weed guard 31 is depressed the constricted portion or throat 71 is forced past the barbed ends 17, 21 and 25 of the hooks 13, 19 and 23. The preloaded torsion on the hooks 19 and 23 results in a force exerted to either side of the weed guard 31 at the flared portion 72. The flared portion 72 then acts as a cam and forces the weed guard 31 to move down and out of the way of the barbed ends 21 and 25. This can be achieved with a collapsible weed guard 31 having the constricted portion 71.

As illustrated in FIG. 1, the weed guard 31 is attached to a coiled hinge or pivot 29 which is secured to the main hook 13. The coiled hinge 29 is formed by wrapping a wire 73 around forming tool 53. With the forming tool 53 still in place, coil section 29 of wire 73 is placed across the top of the shank of the central hook 13, close to the eyelet 15. The two loose ends of the wire 73 are brought across each other on the underside of the central hook 13 and twisted together so that the coil 29 of wire 73 is secured to the shank of the central hook 13. After removing forming tool 53, the weed guard 31 is then inserted into the inside portion of the coil hinge 29 and flux is applied to the coiled wire. Solder is then applied to the preformed coil hinge 29 allowing the solder to flow freely around the coiled wire 73, the weed guard 31, and the shank of the central hook 13. It should be noted that the wire used for making the coiled hinge 29 is preferably copper, or some other material that can be easily soldered. Alternatively, the wire used for making the weed guard 31 is made of preferably stainless steel or some other material which is not easily soldered. By applying solder to the coiled hinge 29 with a weed guard 31 inserted in the same, a journal will be formed for the weed guard with a very close fit. Any excess of the weed guard that protrudes from the coiled hinge 29 is bent at a 90° angle towards the curved portion of the hooks. The excess weed guard material is then cut allowing enough bend in that portion of the weed guard so as to prohibit the weed guard 31 to slip out of the journal formed by the solder inside the coiled hinge 29. At that point the torsionally loaded terrible hook 11 is complete.

The utility of the treble hook is enhanced by utilizing it in conjunction with a hook inserter 75 illustrated in FIG. 17. The hook inserter 75 includes an elongated needle portion 77 and a funnel shaped end section 79. The funnel shaped end section 79 has a cavity of sufficient width to accomodate the three hooks of the torsionally loaded treble hook 11 of the present invention, when it is in a closed position. The combination of the hook inserter and the hooks are then inserted into an appropriate lure 81 and threaded there through.

I claim:
1. A hook device for catching fish comprising:
   a stationary hook having a shank portion and a curved portion;
   at least one oscillatable hook having a shank portion and a curved portion disposed adjacent to the stationary hook;
   a slender torsion bar disposed parallel and adjacent to the shank portions of the stationary hook and the oscillatable hook, said slender bar being secured to the curved portion of the oscillatable hook in a preloaded condition;
   a sleeve surrounding at least a portion of the slender torsion bar and the shank portions of the stationary hook and the oscillatable hook, said sleeve having an interior cross sectional area that provides a minimum clearance fit around the slender torsion bar and the shank portions of the stationary hook and the oscillatable hook whereby the cross sectional area of the hook device is minimized.

2. The device of claim 1 having two oscillatable hooks each having a shank portion and a curved portion.

3. The device of claim 2 wherein said slender torsion bar comprises two substantially straight portions disposed adjacent and parallel to the shank portion of the oscillatable hooks, and said slender torsion bar having an end portion adjacent to each straight portion, and each one of said end portions being secured to one of the curved portions of the oscillatable hooks, in a preloaded condition.

4. The device of claim 1 wherein said means for providing a bearing surface comprises solder.

5. The apparatus of claim 1 wherein said means for maintaining comprises:
   a coiled hinge attached to the upper shank portion of the stationary hook; and
   a pivotable weed guard coupled to the coiled hinge and freely pivotable on said hinge and adapted to secure the hooks in a closed position.

6. The apparatus of claim 5 wherein said week guard comprises an elongated wire terminating in a bent end portion with a constriction thereon whereby the ends of the hooks are maintained in a closed position by the bent end portion, and the week guard is frictionally secured to the ends of the hooks by the constriction.

* * * * *